United States Patent [19]

Freeman et al.

[11] Patent Number: 5,543,968
[45] Date of Patent: Aug. 6, 1996

[54] HELMET MOUNTED DISPLAY SYSTEMS

[75] Inventors: Jonathan P. Freeman, Rochester; Martyn Ingleton, Sheerness; Christopher B. Staveley, Rainham, all of England

[73] Assignee: GEC-Marconi Limited, United Kingdom

[21] Appl. No.: 410,567

[22] Filed: Mar. 24, 1995

Related U.S. Application Data

[63] Continuation of Ser. No. 73,738, Jun. 8, 1993.

[30] Foreign Application Priority Data

Jun. 26, 1992 [BR] Brazil ................................. 9213603.5

[51] Int. Cl.$^6$ ..................................................... G02B 27/14
[52] U.S. Cl. .......................... 359/631; 359/630; 359/632
[58] Field of Search .................................. 359/630–633; 345/7, 8

[56] References Cited

U.S. PATENT DOCUMENTS

| | | | |
|---|---|---|---|
| 3,923,370 | 12/1975 | Mostrom | 359/630 |
| 4,761,056 | 8/1988 | Evans | 359/631 |
| 4,818,858 | 4/1989 | Sorimachi et al. | |
| 4,854,688 | 8/1989 | Hayford et al. | |
| 4,874,214 | 10/1989 | Cheysson et al. | |
| 5,000,544 | 3/1991 | Staveley | 359/630 |
| 5,266,930 | 11/1993 | Ichikawa et al. | 359/630 |

FOREIGN PATENT DOCUMENTS

| | | |
|---|---|---|
| 0284389 | 9/1988 | European Pat. Off. . |
| 0290293 | 11/1988 | European Pat. Off. . |
| 0338703 | 10/1989 | European Pat. Off. . |
| 1489323 | 10/1977 | United Kingdom . |
| 1533859 | 11/1978 | United Kingdom . |
| 2155762 | 10/1985 | United Kingdom . |
| 2161121 | 1/1986 | United Kingdom . |
| 2179543 | 3/1987 | United Kingdom . |
| 2238138 | 5/1991 | United Kingdom . |
| 2247822 | 3/1992 | United Kingdom . |
| 2254160 | 9/1992 | United Kingdom . |
| WO9104508 | 4/1991 | WIPO . |
| WO9203756 | 3/1992 | WIPO . |

*Primary Examiner*—Georgia Y. Epps
*Assistant Examiner*—Ricky Mack
*Attorney, Agent, or Firm*—Kirschstein et al.

[57] ABSTRACT

A helmet mounted display system comprising: a transparent visor; and an optical system which directs rays of light from a display produced by a display source onto a spherical region of the visor to provide by reflection at the visor, at a helmet wearer's eye position, a collimated virtual image of the display on a line of sight of a wearer of the helmet through the visor; the region of the visor being of a shape which is rotationally symmetric about a first axis and the optical system being mounted for rotation about the first axis, thereby to allow rotation of the eye position about the axis.

14 Claims, 3 Drawing Sheets

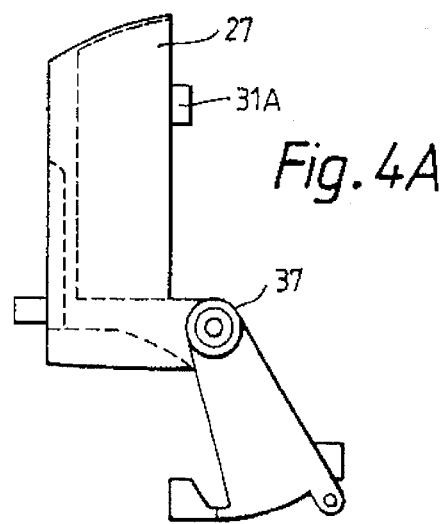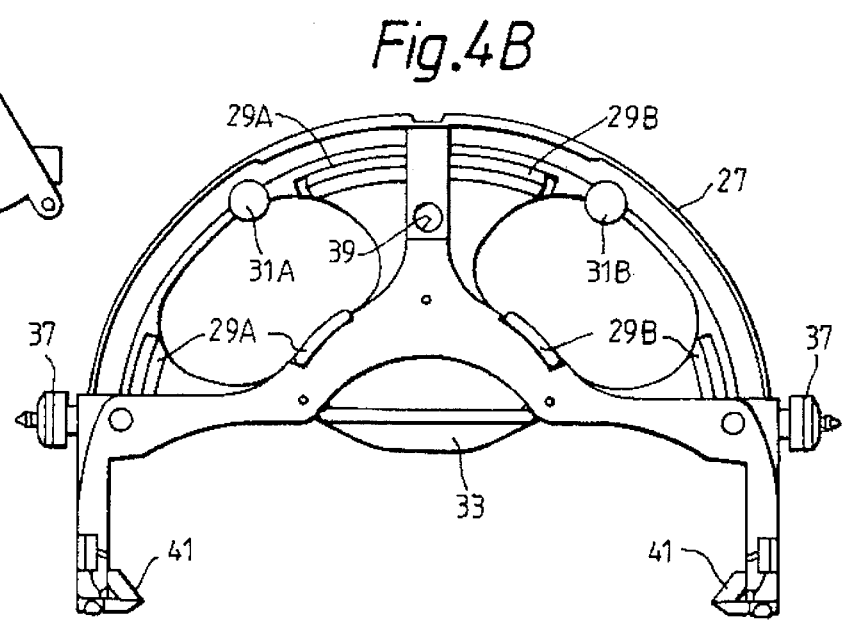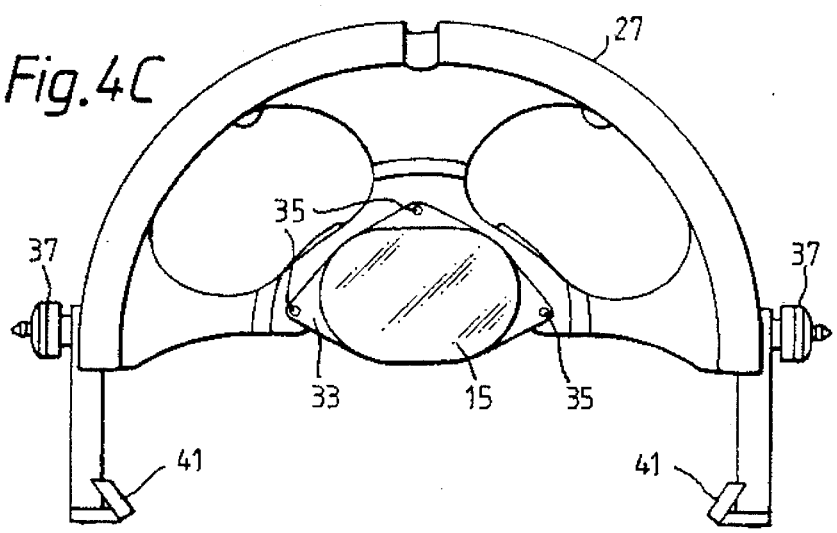

5,543,968

HELMET MOUNTED DISPLAY SYSTEMS

This application is a continuation of application Ser. No. 08/073,738 filed Jun. 8, 1993.

BACKGROUND OF THE INVENTION

This invention relates to helmet mounted display systems.

More particularly the invention relates to helmet mounted display systems of the kind by which a wearer of the helmet on which the system is mounted is provided with a collimated virtual image of a display produced by a display source superimposed on the helmet wearer's view of a scene through a combiner element of the system.

A known form of such a helmet mounted display system comprises: a helmet having a transparent visor; and an optical system which directs rays of light from a display produced by a display source onto a spherical region of the visor to provide by reflection at the visor, at a helmet wearer's eye position, a collimated virtual image of the display on a line of sight of a wearer of the helmet through the visor. Such a helmet mounted display system is hereinafter referred to as a display system of the kind specified.

It will be appreciated that in a display system of the kind specified the visor serves both as a combiner element and a collimating element to produce the required virtual image. The use of the visor as combiner and collimating elements has the advantage that it avoids the use of a relatively heavy eyepiece combiner and collimating element commonly used in helmet mounted display systems. However, use of the visor as the combiner and collimating elements makes it no longer possible to adapt the system to suit a helmet wearer's eye position by movement of the whole display system.

SUMMARY OF THE INVENTION

It is an object of the present invention to provide a display system of the kind specified wherein this problem is overcome.

According to the present invention in a display system of the kind specified said region of the visor is of a shape which is rotationally symmetric about a first axis about which said optical system is rotatable, thereby to allow rotation of said eye position about said axis.

In a system according to the present invention the optical axis of said optical system preferably lies in a plane which contains said first axis.

With such an arrangement, whilst the light rays are subject to off-axis reflection at the visor in said plane, the rays are on-axis in a direction orthogonal to said plane, thereby simplifying off-axis correction.

In a system according to the invention said region of the visor is preferably also rotationally symmetric about a second axis about which said visor is arranged to be rotatable between inoperative and operative positions. In such an arrangement the first and second axes preferably intersect orthogonally.

The invention finds particular application in a binocular helmet mounted system when two separate optical systems according to the invention are used, one for each eye position of the helmet wearer. By arranging for the two optical systems to be rotatable relatively about a common said first axis with a scissors action, the spacing between the eye positions of the two systems can be varied to accommodate helmet wearers of different interpupillary dimensions.

In one particular display system according to the invention the or each optical system comprises a relay lens arrangement incorporating a fold mirror arranged to direct rays of light from the display source downwardly onto a forward facing mirror surface mounted above the face aperture of the helmet which serves to reflect rays from the relay lens arrangement forwardly and downwardly onto the visor.

Where two optical systems of this particular kind are used in a binocular display system, a single said forward facing mirror surface common to both optical system is preferably used.

In a display system according to the invention the components of the or each optical system and the visor are preferably mounted on a frame mounted on the helmet, which frame serves to hold the components and visor in the required positions relative to one another against flexure of the helmet. Preferably the frame is also designed so as to compensate for thermal expansion of at least one component of the optical system.

BRIEF DESCRIPTION OF THE DRAWINGS

One helmet mounted display system in accordance with the invention will now be described, by way of example, with reference to the accompanying drawings in which:

FIGS. 4A, 4B and 4C are side, rear and front views of the frame member.

DETAILED DESCRIPTION OF THE PREFERRED EMBODIMENT

The display system is a binocular system and utilises two display systems according to the invention, one for each eye of a user of the system.

Figure 2:
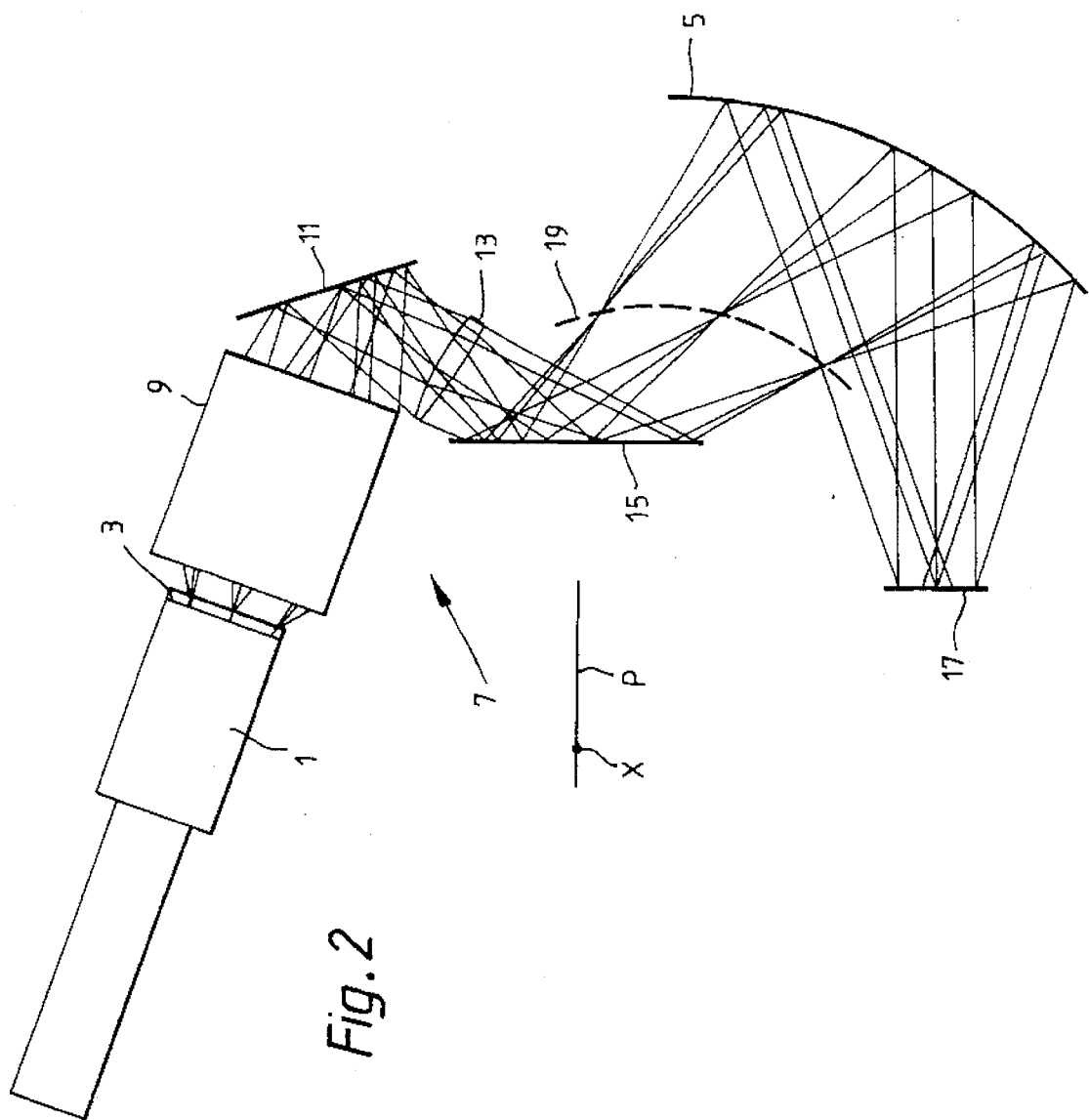
FIG. 2 is a diagram illustrating the light ray paths in an optical system of the display system.

Referring to FIG. 2, the display system for each eye comprises a miniature cathode ray tube (CRT) 1 at the screen 3 of which there is produced a real image of the display it is desired to present to the wearer of the helmet (not shown), superimposed on his view through a spherical visor 5 mounted on the helmet. Light rays from the screen 3 pass first through a relay lens arrangement 7 comprising a lens group 9, a plane fold mirror 11, and a lens 13. Light rays exiting the lens 13 are directed in a general rearwards and downwards direction towards a forwards facing plane mirror 15 mounted at a central brow position on the helmet, i.e. centrally above the helmet face aperture. The mirror 15 is disposed in a generally vertical plane so as to reflect the light rays forwards and downwards, toward a region of the internal, concavely curved surface of the visor 5, for reflection thereat to the left or right eye position 17 of the helmet wearer.

The lens arrangement 7 and lens 13 are positioned and designed to produce a real image of the display on the screen 3 at the principal wavefront 19 of the concave reflecting surface constituted by the internal surface of the visor 5, which image contains equal and opposite optical aberrations to those produced by subsequent reflection at the visor 5. Due to the close proximity of the wavefront 19 to the eye position 17, the helmet wearer is provided at each eye with a large instantaneous field of view of a collimated virtual image of the display on the screen 3, superimposed on the forward scene viewed through the visor 5.

As is apparent from FIG. 2, the optical axis of the optical system of FIG. 2 lies in a plane. This plane is arranged to contain the centre of curvature X of the visor 5. As a result, whilst the light rays reflected at visor 5 are subject to off-axis aberration in the plane of the optical axis, they are on-axis in planes orthogonal to the optical axis plane.

It will be appreciated that whilst depicted as geometrically flat in FIG. 2, the plane is in fact folded by the mirror 11. The purpose of the mirror 11 is to allow the components of the system, more particularly the lens group 9 and CRT 1, to be positioned closely around the helmet wearer's head.

Figure 1:
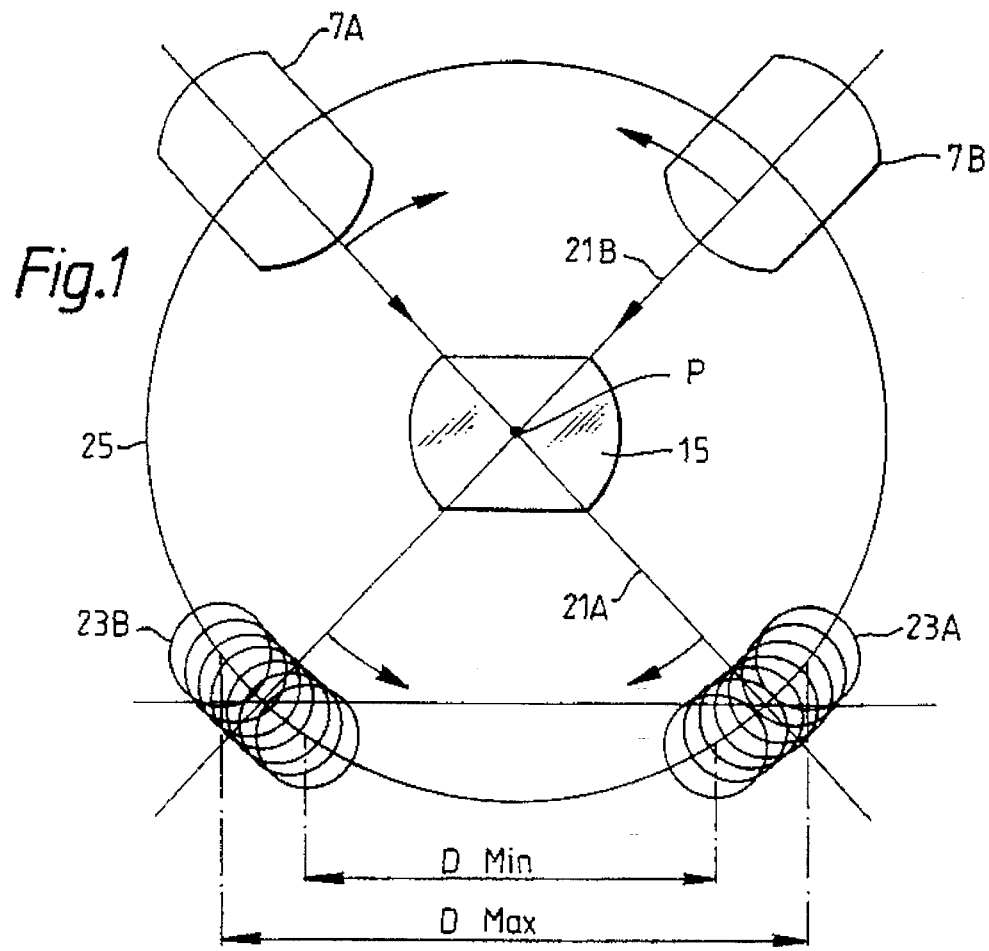
FIG. 1 is a diagrammatic view of the system from the front.

Referring particularly to FIG. 1, the planes 21A and 21B of the optical axes of the optical systems for the helmet wearer's left and right eyes, the components of which systems are differentiated by suffixes A and B respectively, intersect along an axis P passing through the centre of curvature X of the visor 5. Hence, as shown in FIG. 1, the exit pupils 23A, 23B of the two systems lie on a circle 25 centred on the axis P. To allow for variation of the distance D between the centres of the exit pupils 23A and 23B, the planes 21A, 21B are arranged to be rotatable about the axis P. Hence, by moving the planes 21A, 21B relative to one another i.e. with a scissors action, the distance D can be varied between a maximum value D Max and a minimum value D Min to suit the interpupillary distance of the helmet wearer.

By virtue of the rotational symmetry of the visor 5, and by arranging for the two optical systems to share a common brow mirror 15 at a fixed position, i.e. aligned with the axis P along which the optical planes 21A and 21B intersect, it is only necessary to arrange for the components 1 and 7 of each optical system to be rotatable about the axis P to obtain the required rotation of the planes 21A and 21B for variation of the distance D.

As illustrated in FIG. 1, the variation of distance D is accompanied by a variation of the vertical positions of the exit pupils 23A, 23B. This variation is suitably compensated by using liners of different thickness in the helmet to adjust the vertical position of the helmet relative to the wearer's eyes.

As further described below, the distance D is arranged to be variable through several presettable different positions, e.g. seven, as illustrated in FIG. 1. The exit pupils 23A, 23B in adjacent positions are arranged to overlap, and the exit pupils 23A, 23B are made sufficiently larger than a user's eye pupil to allow for small movements of the helmet relative to a wearer's head.

To correct for rotation of the images of the display presented to the helmet wearer as the planes 21A and 21B are rotated relatively, the images of the display on the CRT screens 3A and 3B are rotated electronically between the different presettable positions. Electronic correction of other undesired minor differences in the display in the different presettable positions, e.g. in boresight alignment between the different positions, may also be effected electronically. The required electronic corrections may be determined empirically and stored in a look-up table.

It will be appreciated that for satisfactory operation of the display system the relative positions of the various components of the system have to be accurately maintained against helmet flexures arising from vibration, acceleration, donning and doffing of the helmet etc. and against temperature variations. This problem arises particularly from the fact that visors capable of surviving ejection windblast loading are made from materials such as polycarbonate which exhibit low stiffness and a high thermal coefficient of expansion.

Figure 3:
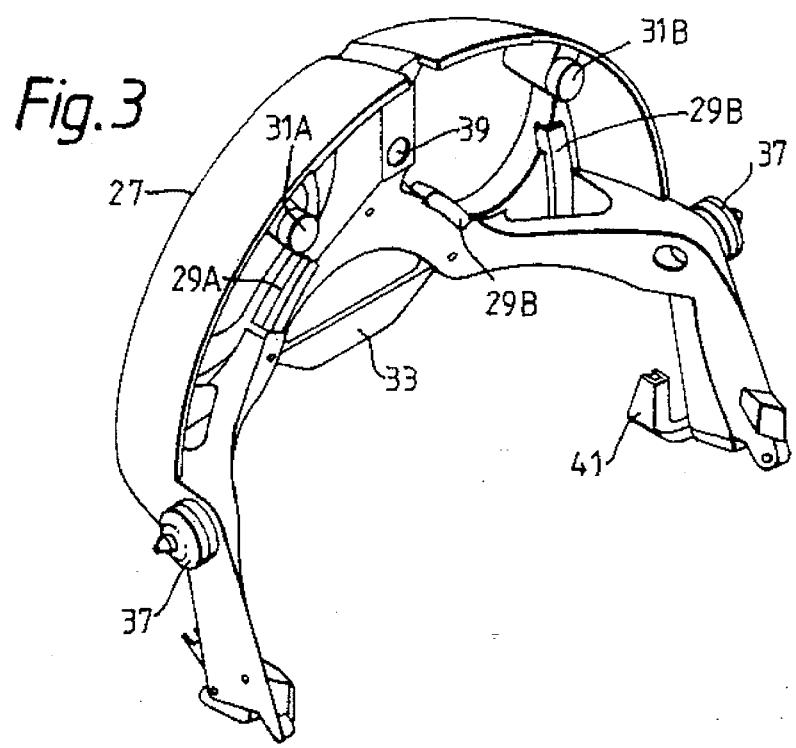
FIG. 3 is a perspective view of a frame member which supports various components of the display system.

To maintain their positions the various components of the system are mounted on a frame member 27 (see FIGS. 3 and 4) which is, in turn, secured to the outside of the shell (not shown) of the helmet around the face aperture, as further described below.

The frame member 27 is made of a rigid material which is capable of holding the optical components in their required relative positions against vibration etc. and is designed to have thermal expansion characteristics which compensate for the thermal expansion of the visor 5. A suitable material is a hybrid composite of carbon, aramid and glass fibre bound in an epoxy resin, and the member 27 is suitably constructed of laminated sections, at orientations selected and arranged to give the required thermal and mechanical performance.

The frame member 27 provides, on its rear side, three kinematic locating surfaces 29A or 29B for the CRT and relay lens arrangements 1A, 7A or 1B, 7B of each optical system, which components 1 and 7 of each system constitute a unit housed in a casing (not shown). The different positions of each such unit 1, 7 are defined by slots at different positions on the unit casing which co-operate with a lug 31A or 31B on the frame member 27.

The brow mirror 15 is also mounted on the frame member 27, on its forward side. To this end the mirror 15 is accurately pre-positioned on a frame 33 which is secured accurately in position on the frame member 27 at three fixing points 35.

The visor 5 is mounted on two pivots 37 on the frame member 27 positioned so that the axis of rotation of the visor 5 between operative and inoperative positions passes through the point X, typically orthogonally to the axis P. In consequence, and by virtue of the rotational symmetry of the visor 5, the need for the operative position of the visor 5 to be accurately defined by stops 41 is avoided.

Positional accuracy of the optical component mounting surfaces and points on the frame member 27 is achieved by first manufacturing the frame member 27 per se, and ageing. Once stability has been confirmed by process control and measurement etc. the mounting surfaces 29 are bonded with an adhesive into position using a precise jig to hold them in position whilst the adhesive cures.

The frame member 27 is mounted on the helmet shell by way of a single spigot (not shown) secured to the helmet shell at a position just above the brow area which fits into an aperture 39 in the member 27. The frame member 27 is also embedded in a so-called helmet module, i.e. a casing fitting around the helmet shell and member 27, the helmet module being in turn secured to the helmet shell by special purpose latches at positions aft of the helmet wearer's ear positions. This arrangement structurally isolates the frame member 27 from helmet shell and module flexures, but fully arrests the helmet module, and hence the frame member 27, in the event of windblast or frontal impact.

It will be understood that whilst in the embodiment of the invention described above by way of example the visor 5 is of overall spherical form, in other embodiments of the invention only a region of the visor on a line of sight of the helmet wearer through the visor is spherical, e.g., the region through which the helmet wearer views the forward scene.

We claim:

1. A helmet mounted display system comprising: a transparent visor; and an optical system including a display source and an optical means for directing rays of light from a display produced by the display source toward a spherical region of the visor to provide by reflection at the visor, at a helmet wearer's eye position, a collimated virtual image of the display on a line of sight of a wearer of the helmet through the visor; said spherical region of the visor being of a shape which is rotationally symmetric about a first axis; and said display source and said optical means being mounted for rotation about said first axis of said rotationally symmetric visor, thereby to allow rotation of said eye position about said first axis.

2. A system according to claim 1 wherein said optical system has an optical axes which lies in a plane which contains said first axis.

3. A display system according to claim 1 wherein said spherical region of the visor is rotationally symmetric about a second axis about which said visor is arranged to be rotatable between inoperative and operative positions.

4. A display system according to claim 3 wherein said first axis and said second axis intersect orthogonally.

5. A display system according to claim 1 wherein the optical system comprises a relay lens arrangement incorporating a fold mirror arranged to direct rays of light from the display source downwardly onto a forward facing mirror surface mounted above a face aperture of the helmet which serves to reflect rays from the relay lens arrangement forwardly and downwardly onto the visor.

6. A binocular helmet mounted display system comprising two optical systems according to claim 1, one for each eye of the helmet wearer.

7. A display system according to claim 6 wherein the two optical systems are mounted for rotation relatively about a common said first axis with a scissors action, thereby to vary the spacing between the eye positions of the two optical systems.

8. A system according to claim 6 wherein each optical system comprises a relay lens arrangement incorporating a fold mirror arranged to direct rays of light from the display source downwardly onto a forward facing mirror surface mounted above a face aperture of the helmet which serves to reflect rays from the relay lens arrangement forwardly and downwardly onto the visor.

9. A system according to claim 8 wherein a single said forward facing mirror surface common to both said optical systems is used.

10. A display system according to claim 1 wherein the optical system and the visor are both mounted on a frame mounted on the helmet which frame serves to hold the optical system and visor in the required positions relative to one another against flexure of the helmet.

11. A display system according to claim 10 wherein said frame is designed so as to compensate for thermal expansion of at least one component of the optical system.

12. A display system according to claim 10 wherein said frame fits around a face aperture of the helmet.

13. A display according to claim 12 wherein said frame is mounted on said helmet by means of a single spigot arrangement.

14. A display system according to claim 12 wherein said frame is secured within a helmet casing member which is in turn attached to a helmet shell member on which said frame is mounted.

* * * * *

UNITED STATES PATENT AND TRADEMARK OFFICE
CERTIFICATE OF CORRECTION

PATENT NO. : 5,543,968
DATED : August 6, 1996
INVENTOR(S) : Jonathan FREEMAN, et al It is certified that error appears in the above-identified patent and that said Letters Patent is hereby corrected as shown below:

On the title page, item [30] Foreign Application Priority Data, should read:
-- Jun. 26, 1992 [GBX] United Kingdom........ 9213603.5--

Signed and Sealed this

Twenty-sixth Day of January, 1999

Attest:

Attesting Officer

*Acting Commissioner of Patents and Trademarks*